May 8, 1956  G. C. HILL, JR  2,744,439
SPECTROMETER SYSTEMS TO COMPENSATE
FOR THE WANDERING OF LIGHT RAYS
Filed Aug. 10, 1951  2 Sheets-Sheet 1
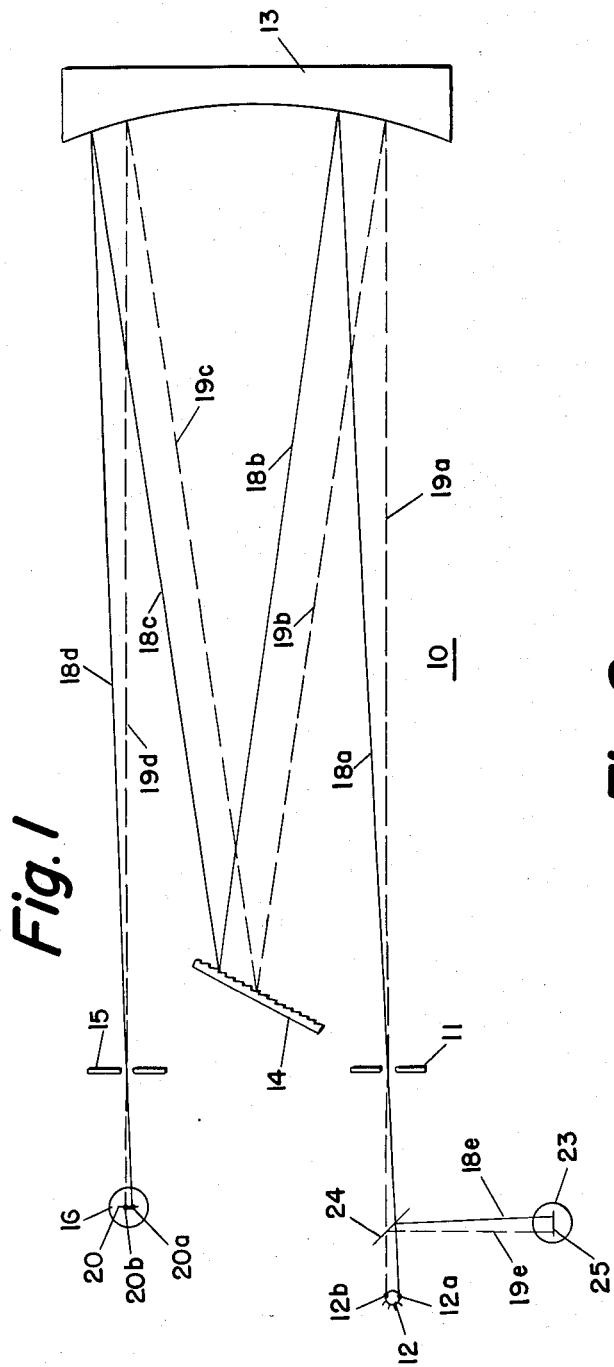
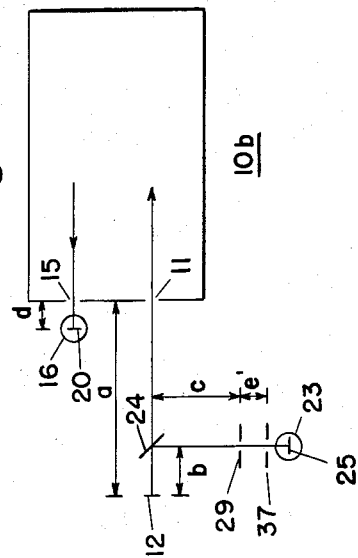
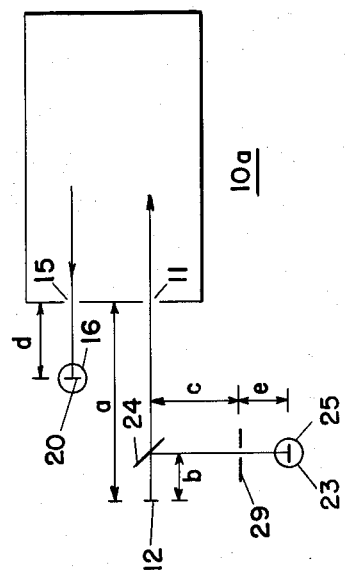
*INVENTOR.*
GEORGE C. HILL, JR.
BY
Woodcock and Phelan
ATTORNEYS

INVENTOR.
GEORGE C. HILL, JR

BY

*Woodcock and Phelan*

ATTORNEYS

United States Patent Office 2,744,439
Patented May 8, 1956

2,744,439

SPECTROMETER SYSTEMS TO COMPENSATE FOR THE WANDERING OF LIGHT RAYS

George C. Hill, Jr., Philadelphia, Pa., assignor to Leeds and Northrup Company, Philadelphia, Pa., a corporation of Pennsylvania Application August 10, 1951, Serial No. 241,258

5 Claims. (Cl. 88—14)

This invention relates to the direct determination of the percentage composition of specimens by spectrochemical analysis, and particularly to apparatus for minimizing measurement errors resulting from wandering of the spectrochemical discharge across the analytical gap, thereby adversely affecting the stability of the ratio measurements obtained in direct-reading spectrochemical analysis.

In the majority of prior art systems quantitative measurements in spectrochemical analysis employing either photographic or direct-recording methods have been based upon the long established internal-standard principle. In both methods quantitative analysis involves intensity measurements of two spectral lines, one line being of the matrix element whose concentration is to be determined, and the other line, called the internal-standard line, is of an element whose concentration is known. The element of known concentration is usually a large or major constituent of the specimen matrix, or in some cases, for which the method of mixtures is employed, is an element known not to be present in the original specimen but added thereto in known and usually small quantity for analytical purpose. In all the foregoing, both the reference line and the analytical line originate in the excited specimen serving as a radiation source for the spectrometer, and both are separated from the overall emitted radiation by the grating, prism, or other spectrum-producing means of the spectrometer.

The foregoing spectrometer systems are subject to the disadvantage that the range of variation of the reference element for which a single analytical curve affords sufficient accuracy is quite limited. This disadvantage has been overcome to substantial degree by the improved spectrometer systems disclosed in United States Letters Patent No. 2,734,418, granted upon copending application Serial No. 156,763, filed April 19, 1950, by John H. Enns, wherein the intensity of a spectrum line of each element whose concentration is to be determined is compared with respect to the intensity of a selected band of the total radiation of the excited specimen, there being no segregation of the reference line as in the aforesaid prior spectrographic methods and systems. With such an arrangement, a single analytical curve affords suitable high accuracy over a substantially enhanced range of variation of any of the constituent elements of the specimen matrix.

The present invention is described as applied to a spectrometer system utilizing as a reference the intensity of a selected band of the total radiation from the excited specimens as disclosed in the aforementioned Enns patent, and sometimes referred to as an "overall light" reference.

In photographic spectroscopy errors may result from variations in intensity from one spark to another derived from the same specimen electrode. In direct-reading instruments there is a further problem involved caused by wandering of the spark across the surface of the electrodes. Intensity fluctuations from spark to spark may be minimized in either photographic or direct-reading instruments since the variations affect both the measured element line and the overall light reference in the same manner, and thus the ratio measurement is not affected. However, in the case of wandering of the spark across the electrode surface in direct-reading spectrometers there will be caused intensity changes that are not equal for both the element line and the overall light reference which results in errors in the ratio measurements.

Various prior art systems have been proposed for minimizing the adverse effects of a wandering spark on the stability of the ratio measurement of direct-reading spectrometers. These prior art systems have utilized a diffusion screen at various locations in the optical path of the spectrometer systems, and while to some extent they have been successful in minimizing the effect of wandering of the spark, nevertheless they have all been subject to the disadvantage that there is a substantial loss in intensity thereby rendering the system inefficient.

In accordance with the present invention, the adverse effect of wandering of the spark from a spectrochemical source may be minimized by positioning a slit at a predetermined distance from the reference photo-tube, or equivalent radiation-responsive means, which views undispersed light from the analytical source, and adjusting the distance from the source to the slit to obtain a match between the intensity vs. lateral motion curves for both the analyzing and reference photo-tubes. When the intensity vs. lateral motion curves for both the analyzing and reference receivers have been matched, the intensity ratio of the element line to the overall light reference will remain substantially the same for any position of the discharge or spark between the specimen electrodes.

Further in accordance with the invention, there may be positioned in the path of the overall light directed to the reference-radiation-responsive means a fixed slit and a slit of adjustable width, the width of the latter being varied to obtain a match between the intensity vs. lateral motion curves of both the analyzing-radiation-responsive means and the reference-radiation-responsive means.

Further in accordance with the invention, but more specifically, there is provided an optical system including reference-radiation-responsive means, a source of radiation to be analyzed and a spectrometer having an entrance and an exit slit. There is a slit disposed in the path of radiation directed to the reference-radiation-responsive means and the distance through which the radiation travels from the source to this slit bears a predetermined ratio with respect to the distance from the source of radiation to the spectrometer entrance slit. There is further provided analyzing-radiation-responsive means disposed to receive radiation from the spectrometer exit slit and structures, including a slit, having dimensions significant relative to control of radiation received by each of the radiation-responsive means, these dimensions having values bearing substantially the same ratio one to the other as the aforementioned ratio.

For more detailed understanding of the invention and for further objects and advantages thereof, reference is made to the accompanying drawings, in which:

Fig. 1 is an optical system of a grating type spectrometer utilizing overall light as a reference and adaptable to the present invention;

Fig. 2 is a schematic illustration of one form of the invention as applied to the spectrometer optical system of Fig. 1;

Fig. 3 is a schematic illustration of another modification of the invention as applied to the spectrometer optical system illustrated in Fig. 1.

Figure 5:
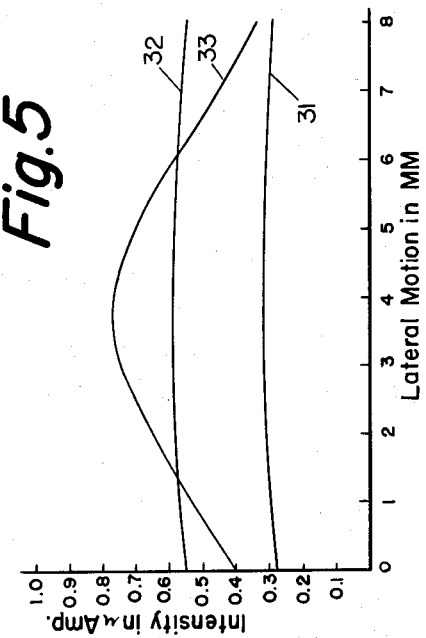
Figs. 4–7 are curves relating to and illustrative of variations in intensity resulting from lateral movement of the source of radiation.

Referring to Fig. 1 there is illustrated an optical system of a grating type spectrometer 10 having an entrance slit 11 through which radiation from excited specimen or source 12 passes to one area of a collimating mirror 13 which directs the radiation in parallel rays to diffraction grating 14. The dispersed radiation is directed from diffraction grating 14 to a second area of collimating mirror 13 from which is focused a spectral line upon the exit slit 15 for passage therethrough to the analyzing-radiation-responsive means which has been illustrated as a photomultiplier tube 16. Undiffracted reference radiation for the reference-radiation-responsive means which has been illustrated as a photomultiplier tube 23, is derived from the total radiation emanating from the source 12 by a partially transparent and partially reflective member 24 of quartz, for example, which may be disposed between the source 12 and entrance slit 11 of the spectrometer. For further description relating to the utilization of overall light as a reference, reference may be had to the aforementioned Patent 2,734,418.

In Fig. 1 the effect of wandering of the spark across the surface of the electrode or source 12 may readily be seen by considering the solid line path comprising lines 18a—18d as representative of radiation emanating from a point 12a at one side of the source 12. As is the usual practice, the entrance slit 11 is fully illuminated by a cone of rays comprising many points of light or bundles of rays and the slit remains fully illuminated even though the spark wanders. For purposes of explanation, however, there will be considered here the movement of only a single point of light within the aforementioned cone of light illuminating the entrance slit to illustrate the effect of a shift in the angle of incidence of each point or bundle of rays with respect to the entrance slit of the monochromator upon wandering of the spark. These points of light are of different relative intensities.

Figure 4:
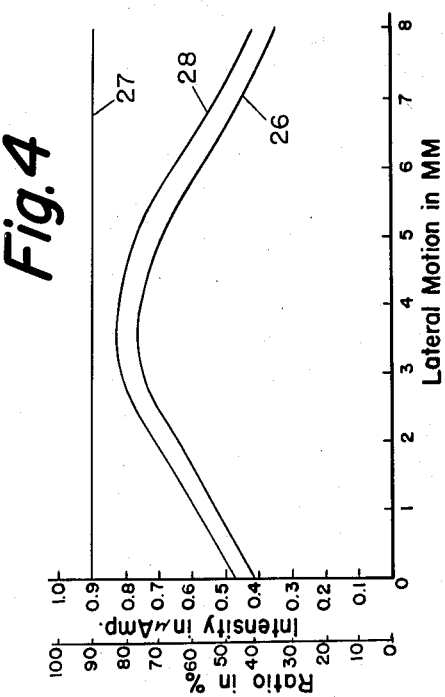

As illustrated in Fig. 1, a shift in the angle of incidence of a point or small bundle of light rays upon the entrance slit 11 causes the element of light to fall upon a slightly different area of the mirror 13, a different area of the grating 14, a different area of the exit slit 15, and if the element of light passes through the exit slit and is in the cone of rays received by the sensitive area 20 of the photocell 16, it will impinge upon a different area of the photocell surface. Thus as the spark moves from point 12a to point 12b at the opposite side of source 12, the resulting shift of the path of radiation therefrom as illustrated by the broken lines 19a—19d representing rays from one of a plurality of points causes the resulting spectral image to traverse exit slit 15 and a similar traverse by the radiation passing through exit slit 15 over the photo-sensitive surface 20 of the photomultiplier tube 16 from point 20a to point 20b. The intensity of the point of light appears to undergo changes within the monochromator due to optical defects such, for example, as spherical aberration of the mirror, ruling defects in the grating and baffling or masking as at the entrance slit, the mirror and the exit slit. Due to the non-uniformity in response inherent in the photo-sensitive surface 20 and since the various points of light have different relative intensities the movement of the spectral image and the resulting radiation on surface 20 from point 20a to point 20b results in an intensity variation similar to the curve 26 of Fig. 4 where the abscissa is a function of lateral motion in millimeters and the ordinate is a function of intensity in microamperes. The integrated light intensity changes due to change within the monochromator and any change due to shift of the elements or points of light on the receiving area of the phototube produce change in the output therefrom which is a source of error eliminated by this invention. Due to the shift in the spark source from point 12a to point 12b, there will likewise be a shift in the path of a point of the radiation directed to the photo-sensitive surface 25 of reference photomultiplier tube 23 as indicated by the solid line 18e and the dotted line 19e. While the radiation moves across the photo-sensitive surface 25 of radiation receiver 23 since there is no obstruction in its path from the source 12 to the photo-sensitive surface 25, the intensity of radiation received thereon will be uniform as illusrated by curve 27 of Fig. 4. The non-uniformity in intensity received by the analyzing cell 16 and illustrated by curve 26 is due primarily to the interposition of slits 11 and 15 in the optical system of spectrometer 10. Since there is no obstruction such as slit structure in the path of radiation from the source 12 to the reference phototube 23, the latter will receive a cone of rays that more than completely covers the sensitive area 25 of the photocell while the analyzing phototube 16, due to the interposition of slits 11 and 15, receives a cone of rays that does not completely cover the sensitive surface 20 of the photocell 16. It is to be noted that this effect is not peculiar to this particular optical system, but is present in any slitted optical system.

The direct recording or indication of the percentage composition of each of the selected constituents of the specimen is determined by the ratio of the output currents of the analyzing cell 16 with respect to the reference cell 23. Inasmuch as the output currents of the cells are dependent on the intensity of radiation received on their photo-sensitive surfaces and their uniformity of response, it is readily apparent from curves 26 and 27 of Fig. 4 that ratio measurements based thereon will not be constant as the spark wanders from point 12a to point 12b. Rather than a constant or uniform ratio, the ratio obtained will fluctuate in a manner similar to curve 28, which is a ratio of curve 26 to curve 27, and thus will require a relatively long time of measurement in order to integrate the resulting signal.

The ratio measurements may be made by means of a ratio recorder, for example, of the type described and claimed in Williams Patent No. 2,522,976.

Referring to Fig. 2, there is schematically illustrated one form of the invention whereby the foregoing defects in the ratio measurements by direct reading instruments has been overcome to a substantial degree. Constant ratio measurements may be obtained independently of wandering of the spark source if provision is made for matching of the intensity vs. lateral motion curves of the analyzing-radiation-responsive means and the reference-radiation-responsive means. Fig. 2 is a schematic illustration of a spectrometer 10a similar to spectrometer 10 of Fig. 1 but having a slit 29 interposed in the optical path between photomultiplier tube 23 and member 24. The physical locations of the various elements in the system have been designated as follows: Member 24 is located $b$ distance from source 12, slit 29 in the overall light system is $c$ distance from member 24, and reference photomultiplier tube 23 has its photo-sensitive surface 25 located $e$ distance from slit 29. Entrance slit 11 of the spectrometer is $a$ distance from source 12, and exit slit 15 is $d$ distance from the photo-sensitive surface 20 of analyzing photomultiplier tube 16. By varying the distance $b+c$ from the source 12 to slit 29 and keeping the distance $e$ from slit 29 to the photo-sensitive surface 25 of photomultiplier tube 23 constant, there may be obtained a family of curves 31—33 constant, there may be obtained 31—33 have been plotted with lateral motion in millimeters as the abscissa and intensity in microamperes as the ordinate. In obtaining the data for each of curves 31—33 the distance $e$ between the slit 29 and the photosensitive surface 25 of the reference photomultiplier tube 23 was fixed at two inches and the slit width was in the order of fifty microns. Curve 31 was obtained by having a distance $b+c$ from slit 29 to source 12 of two inches. Curve 32 was obtained by having the distance $b+c$ equal to five inches, and curve 33 was obtained by having the distance $b+c$ equal to nine inches.

If the sensitive surfaces of the analyzing-radiation-responsive means and the reference-radiation-responsive means are equivalent or substantially so, the intensity vs.

lateral motion characteristics for both the analyzing and reference receivers will be substantially identical when the following equation is satisfied:

$$(1) \quad \frac{e}{d} = \frac{b+c}{a}$$

where:

$a$ is the distance from the source of radiation to the entrance slit of the spectrometer, $b+c$ is the distance from the source of radiation to the slit in the path of the radiation directed to the reference-radiation-responsive means, $e$ is the distance between the slit in the path of the radiation directed to the reference-radiation-responsive means and the reference-radiation-responsive means, and $d$ is the distance between the exit slit of the spectrometer and the analyzing-radiation-responsive means.

Figure 6:
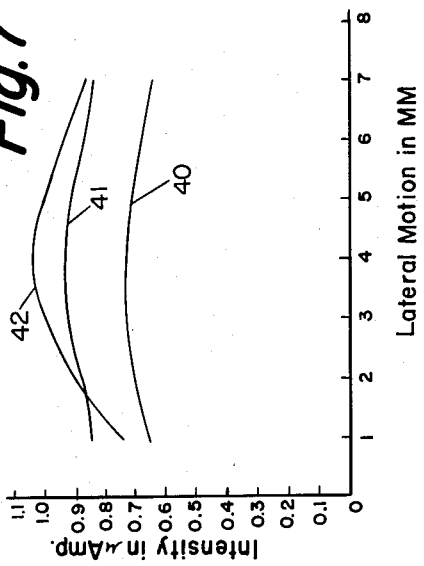

With the various elements of the optical system of the spectrometer positioned in accordance with the Equation 1, the intensity vs. lateral motion curve of the reference receiver will have been made substantially to match the intensity vs. lateral motion curve for the analyzing receiver. Thus the ratio measurements representative of the intensity ratio of the element line with respect to the overall light reference will remain substantially the same for any position of the discharge or spark between the specimen electrodes. The effect on the ratio measurements obtained with the various elements of the optical system of the spectrometer positioned in accordance with Equation 1 may be seen by curve 34 in Fig. 6. Curve 34 is illustrative of a ratio vs. lateral motion curve where the abscissa is a function of lateral motion in millimeters and the ordinate is a ratio in per cent. Curve 35 is exemplary of an intensity vs. lateral motion curve of a reference-radiation-receiver that has been matched to an analyzing-radiation-receiver in accordance with Equation 1. Curve 34 was obtained by dividing the intensity vs. lateral motion curve for the analyzing-radiation-receiver by the curve 35. As may be seen curve 34 is generally flat throughout a substantial portion of its length thus providing for substantially uniform ratio measurements for any position of the discharge or spark between the specimen electrodes. The substantial improvement in uniformity of ratio measurements may readily be seen by comparing curve 34 with curve 28 of Fig. 4, the latter being representative of a ratio measurement vs. lateral motion curve in a spectrometer system wherein the intensity vs. lateral motion curve of the analyzing receiver and the reference receiver have not been matched.

Figure 7:
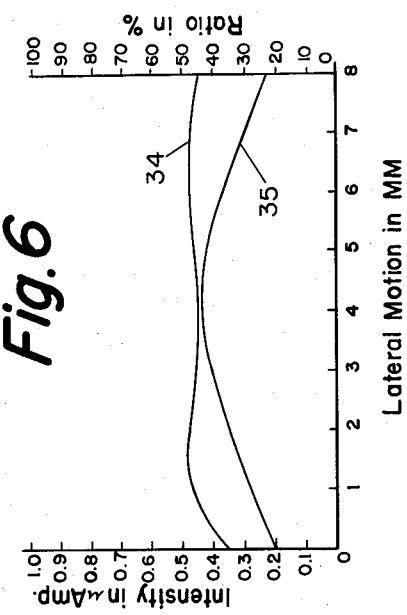

Referring to Fig. 3, there is schematically illustrated another form of the invention whereby the errors in ratio measurements by direct-recording instruments due to wandering of the spark source have been overcome to a substantial degree. Fig. 3 is a schematic illustration of a spectrometer 10b similar to spectrometer 10 of Fig. 1 but having a slit 29 interposed in the optical path between reference photomultiplier tube 23 and member 24, similar to spectrometer 10b of Fig. 2, and a second slit 37 disposed between slit 29 and the reference photomultiplier tube 23. The corresponding elements and the physical locations thereof have been designated by like reference characters to those used in describing Figs. 1 and 2. The additional slit 37 which is adjustable as to width is positioned at a distance $e'$ from the slit 29 in a direction towards the reference photomultiplier tube 23 and as close thereto as reasonably practical. By keeping the distance $b+c$ from source 12 to the first slit 29 constant and by varying the width of the inner or second slit 37 there may be obtained a family of curves 40—42 as shown in Fig. 7. Curves 40—42 have been plotted with lateral motion in millimeters as the abscissa and intensity in microamperes as the ordinate. In obtaining the data for each of curves 40—42 the distance $b+c$ from source 12 to slit 29 remained constant at 2 inches, the distance $e'$ from slit 29 to slit 37 remained constant at 2 inches, and the width of slit 29 was constant at 50 microns. Curve 40 was obtained by having a width $s$ of slit 37 of 1/16 inch. Curve 41 was obtained by having a width $s$ of slit 47 of 1/8 inch and curve 42 was obtained by having a width $s$ of slit 37 of 1/100 inch.

With the sensitive surfaces of the analyzing-radiation-responsive means and the reference-radiation-responsive means equivalent or substantially so and the width of the sensitive surface 25 of the reference photo-tube 23 greater than the width $s$ of slit 37, and if the distance $d$ from the sensitive surface 20 having width $p$ of the analyzing photo-tube 16 to the exit slit 15 is equal to the distance $e'$ between the slits 29 and 37 in the overall light reference system, the intensity vs. lateral motion characteristics for both the analyzing and reference receivers will be substantially identical when the following equation is satisfied:

$$(2) \quad \frac{p}{s} = \frac{b+c}{a}$$

where:

$a$ is the distance from the source of radiation to the entrance slit of the spectrometer $b+c$ is the distance from the source of radiation to the first slit in the path of the radiation directed to the reference-radiation-responsive means, $p$ is the width of the sensitive surface of the analyzing-radiation-responsive means, and $s$ is the width of the slit adjacent the reference-radiation-responsive means.

With the various elements of the optical system of the spectrometer positioned in accordance with the Equation 2, the intensity vs. lateral motion curve of the reference-radiation-responsive means will have been made substantially to match the intensity vs. lateral motion curve for the analyzing-radiation-responsive means. Accordingly, the ratio measurements representative of the intensity ratio of the element line with respect to the overall light reference will remain substantially the same for any position of the discharge or spark between the specimen electrodes and the ratio vs. lateral motion curves obtained with the various elements of the spectrometer positioned in accordance with the Equation 2 will be similar to curve 34 in Fig. 6.

In the aforementioned prior art system wherein the effect of wandering of the spark has been minimized by the use of a diffusion screen thereby making the positioning of the photo-tube less critical, there has been a substantial loss of intensity. For example, with a distance from the source of radiation to the diffusion screen of approximately ½ inch and the diffusion screen focused onto the entrance slit, there is a resulting loss of intensity by a factor of about twenty-five. Due to the high inefficiency of said prior art systems, in analyses involving weak spectral lines correction methods which substantially reduce already weak light intensities cannot be utilized in apparatus having only a short time interval for light integration.

By providing a spectrometer having the various elements of its optical system positioned in accordance with either Equation 1 or 2, the adverse effects of a wandering spark on the stability of the ratio measurement of direct-reading spectrometers will have been substantially eliminated and further, the flattening of the resulting ratio curve is accomplished without loss in intensity.

From the foregoing, it will be seen that a third general equation may be written as follows:

$$(3) \quad \frac{x}{y} = \frac{b+c}{a}$$

where:

$x = e$ when $y = d$ (Equation 1), or
$x = p$ when $y = s$ (Equation 2).

What is claimed is:

1. An optical system for a spectrometer to compensate for the wandering of light rays from an analytical source comprising reference-radiation-responsive means, a source of radiation to be analyzed, a spectrometer having an entrance slit and an exit slit, slit means in the path of undispersed radiation directed to said reference-radiation-responsive means, and analyzing-radiation-responsive means disposed to receive dispersed radiation from said spectrometer exit slit, characterized in that the ratio of the distance from said slit means to said reference-radiation-responsive means to the distance from said exit slit to said analyzing-radiation-responsive means has approximately the same value as the ratio of the distance through which the radiation travels from said source to said slit means with respect to the distance from said source to said spectrometer entrance slit to effect a match between the intensity vs. lateral motion curves of said analyzing-radiation-responsive means and said reference-radiation-responsive means.

2. An optical system for a spectrometer to compensate for the wandering of light rays from an analytical source comprising reference-radiation-responsive means, a source of radiation to be analyzed, a spectrometer having an entrance slit and an exit slit, first and second slit means in the path of undispersed radiation directed to said reference-radiation-responsive means, and analyzing-radiation-responsive means having a sensitive surface disposed to receive dispersed radiation from said spectrometer exit slit, characterized in that the ratio of the width of the sensitive surface of said analyzing-radiation-responsive means to the slit width of said second slit means adacent said reference-radiation-responsive means has approximately the same value as the ratio of the distance through which the radiation travels from said source to said first slit means with respect to the distance from said source to said spectrometer entrance slit to effect a match between the intensity vs. lateral motion curves of said analyzing-radiation-responsive means and said reference-radiation-responsive means.

3. An optical system for a spectrometer to compensate for the wandering of light rays from an analytical source comprising a spectrometer having entrance and exit slit means, source means of radiation disposed for directing radiation to the entrance slit of said spectrometer, analyzing-radiation-responsive means disposed to receive dispersed radiation from the exit slit of said spectrometer, reference-radiation-responsive means disposed to receive undispersed radiation from said source, and slit means disposed in the radiation path between said source and said reference-radiation-responsive means, said foregoing means comprising said optical system being physically positioned in accordance with the equation:

$$\frac{e}{d} = \frac{b+c}{a}$$

where:

$a$ is the distance from the source means of radiation to the entrance slit means of the spectrometer,
$b+c$ is the distance from the source means of radiation to the slit means in the path of radiation directed to the reference-radiation-responsive means,
$e$ is the distance between the slit means and the reference-radiation-responsive means, and
$d$ is the distance between the exit slit means of the spectrometer and the analyzing-radiation-responsive means, to effect a match between the intensity vs. lateral motion curves of said analyzing-radiation-responsive means and said reference-radiation-responsive means.

4. An optical system for a spectrometer to compensate for the wandering of light rays from an analytical source comprising a spectrometer having entrance and exit slit means, source means of radiation disposed for directing radiation to the entrance slit of said spectrometer, analyzing-radiation-responsive means having a sensitive surface disposed to receive dispersed radiation from the exit slit of said spectrometer, reference-radiation-responsive means disposed to receive undispersed radiation from said source, and first and second slit means disposed in the radiation path between said source and said reference-radiation-responsive means, said foregoing means comprising said optical system being physically positioned in accordance with the equation:

$$\frac{p}{s} = \frac{b+c}{a}$$

where:

$a$ is the distance from the source means of radiation to the entrance slit means of the spectrometer,
$b+c$ is the distance from the source means of radiation to the first slit means in the path of radiation directed to the reference-radiation-responsive means,
$p$ is the width of a sensitive surface of said analyzing-radiation-responsive means, and
$s$ is the slit width of the second slit means in the path of radiation directed to the reference-radiation-responsive means, to effect a match between the intensity vs. lateral motion curves of said analyzing-radiation-responsive means and said reference-radiation-responsive means.

5. An optical system for a spectrometer to compensate for the wandering of source light rays comprising a spectrometer having entrance and exit slit means, source means of radiation disposed for directing radiation to the entrance slit of said spectrometer, analyzing-radiation-responsive means disposed to receive dispersed radiation from the exit slit of said spectrometer, reference-radiation-responsive means disposed to receive undispersed radiation from said source, and slit means including at least one slit structure disposed in the radiation path between said source and said reference-radiation-responsive means, said foregoing means of said optical system being physically positioned in accordance with the equation:

$$\frac{x}{y} = \frac{b+c}{a}$$

with $x$ and $y$ determined as follows: when $x=e$, then $y=d$, and when $x=p$, then $y=s$, and where:

$a$ is the distance from the source means of radiation to the entrance slit means of the spectrometer,
$b+c$ is the distance from the source means of radiation to the first slit structure of said slit means in the path of radiation directed to the reference-radiation-responsive means,
$e$ is the distance between the first slit structure of said slit means and the reference-radiation-responsive means,
$d$ is the distance between the exit slit means of the spectrometer and the analyzing-radiation-responsive means,
$p$ is the width of a sensitive surface of said analyzing-radiation-responsive means, and
$s$ is the slit width of a second slit structure of said slit means in the path of radiation directed to and adjacent the reference-radiation-responsive means, to effect a match between the intensity vs. lateral motion curves of said analyzing-radiation-responsive means and said reference-radiation-responsive means.

(References on following page)

References Cited in the file of this patent

UNITED STATES PATENTS

| | | |
|---|---|---|
| 1,877,501 | Exton | Sept. 13, 1932 |
| 2,502,319 | Golay | Mar. 28, 1950 |

FOREIGN PATENTS

| | | |
|---|---|---|
| 664,233 | Germany | Aug. 24, 1938 |

OTHER REFERENCES

Spectrometer, by J. L. Saunderson et al., Reprint from May 1946, Metal Progress.

Harrison et al.: "Practical Spectroscopy," published by Prentice-Hall, Inc., New York, 1948, pages 193, 441, 453.

Twyman: "Metal Spectroscopy," published by Griffin & Co., Ltd., London, 1951, pages 195 through 228.